US010357910B2

(12) United States Patent
Hoffmann et al.

(10) Patent No.: US 10,357,910 B2
(45) Date of Patent: Jul. 23, 2019

(54) TECHNIQUES FOR COATING PIPES

(71) Applicant: Subsea 7 Limited, Sutton (GB)

(72) Inventors: Philippe Benoit Jacques Hoffmann, Rousset-les-Vignes (FR); Mike Gordon, Godalming (GB); Nicolas Monfort-Moros, London (GB); Sylvain Popineau, London (GB)

(73) Assignee: Subsea 7 Limited, Sutton (GB)

( * ) Notice: Subject to any disclaimer, the term of this patent is extended or adjusted under 35 U.S.C. 154(b) by 344 days.

(21) Appl. No.: 15/033,083

(22) PCT Filed: Oct. 30, 2014

(86) PCT No.: PCT/GB2014/053235
§ 371 (c)(1),
(2) Date: Apr. 28, 2016

(87) PCT Pub. No.: WO2015/063496
PCT Pub. Date: May 7, 2015

(65) Prior Publication Data
US 2016/0279847 A1    Sep. 29, 2016

(30) Foreign Application Priority Data

Oct. 31, 2013 (GB) .................................. 1319287.7

(51) Int. Cl.
*B29C 45/17* (2006.01)
*B29C 45/26* (2006.01)
(Continued)

(52) U.S. Cl.
CPC ...... *B29C 45/174* (2013.01); *B29C 45/14598* (2013.01); *B29C 45/14622* (2013.01);
(Continued)

(58) Field of Classification Search
CPC ..... B29C 45/174; B29C 45/261; B29C 45/43; B29C 45/7331; B29C 45/1734;
(Continued)

(56) References Cited

U.S. PATENT DOCUMENTS 3,172,571 A * 3/1965 Marchak .......... B29C 45/14336
138/128
3,417,899 A * 12/1968 Brown .............. B29C 45/14598
220/611

(Continued)

FOREIGN PATENT DOCUMENTS

DE    198 52 123    5/2000
DE    199 50 261    4/2001
(Continued)

OTHER PUBLICATIONS

Eckardt H: "Techniques for gas-assist injection molding" Gas Assist Injection Molding, Jan. 2001, pp. 30-59 (Year: 2001).*

(Continued)

*Primary Examiner* — Nahida Sultana
(74) *Attorney, Agent, or Firm* — Levy & Grandinetti

(57) ABSTRACT

A thermoplastics injection molding process coats a field joint of a pipeline by positioning a mold tool around the field joint to define a mold cavity. Thermoplastics material injected into the mold cavity forms a field joint coating that will set in the mold cavity. As the thermoplastics material shrinks in the mold cavity while the field joint coating sets, compacting pressure is applied radially inwardly within the mold cavity against a radially outer side of the field joint coating. A compacting fluid introduced into the mold cavity between the mold tool and the field joint coating may be used to apply pressure against the field joint coating. This accelerates and controls cooling of the field joint coating while maximizing quality.

14 Claims, 5 Drawing Sheets

(51) Int. Cl.

| | | |
|---|---|---|
| *F16L 58/18* | (2006.01) | |
| *F16L 59/20* | (2006.01) | |
| *F16L 1/20* | (2006.01) | |
| *B29C 45/14* | (2006.01) | |
| *B29C 45/43* | (2006.01) | |
| *B29C 45/73* | (2006.01) | |
| *B29L 23/00* | (2006.01) | |
| *B29C 45/72* | (2006.01) | |
| *B29L 9/00* | (2006.01) | |
| *B29C 45/56* | (2006.01) | |
| *B29K 23/00* | (2006.01) | |
| *B29K 25/00* | (2006.01) | |
| *B29K 105/00* | (2006.01) | |
| *B29K 105/20* | (2006.01) | |
| *B29K 705/12* | (2006.01) | |

(52) U.S. Cl.
CPC ........ *B29C 45/1734* (2013.01); *B29C 45/261* (2013.01); *B29C 45/43* (2013.01); *B29C 45/7331* (2013.01); *F16L 1/206* (2013.01); *F16L 58/181* (2013.01); *F16L 59/20* (2013.01); *B29C 45/561* (2013.01); *B29C 45/7207* (2013.01); *B29C 2045/14893* (2013.01); *B29C 2045/1707* (2013.01); *B29K 2023/12* (2013.01); *B29K 2025/06* (2013.01); *B29K 2105/0058* (2013.01); *B29K 2105/20* (2013.01); *B29K 2705/12* (2013.01); *B29K 2995/0015* (2013.01); *B29L 2009/003* (2013.01); *B29L 2023/22* (2013.01); *B29L 2023/225* (2013.01)

(58) Field of Classification Search
CPC ........ B29C 45/14622; B29C 45/14598; B29C 45/561; B29C 45/7207; B29C 2045/14893; B29K 2023/12; B29K 2023/225
See application file for complete search history.

(56) References Cited

U.S. PATENT DOCUMENTS

| | | | | |
|---|---|---|---|---|
| 4,660,861 | A | | 4/1987 | Argy et al. |
| 9,046,195 | B2 | * | 6/2015 | Hoffmann ............... B29C 45/04 |
| 2008/0053554 | A1 | * | 3/2008 | Salama ................. B29C 70/086 138/172 |
| 2009/0297319 | A1 | * | 12/2009 | Kalb ...................... B25J 9/0012 414/751.1 |
| 2010/0072678 | A1 | * | 3/2010 | Augustin ............. B21D 26/033 264/526 |
| 2010/0133324 | A1 | * | 6/2010 | Leiden ................ B29C 47/0866 228/176 |
| 2010/0143041 | A1 | * | 6/2010 | Bregonzio .......... F16L 13/0272 405/154.1 |
| 2010/0258974 | A1 | * | 10/2010 | Wallace .............. B29C 33/0044 264/262 |
| 2011/0036490 | A1 | * | 2/2011 | Mamish ..................... C09J 5/00 156/187 |
| 2016/0168719 | A1 | * | 6/2016 | Chuyko ................ F16L 58/181 427/236 |

FOREIGN PATENT DOCUMENTS

| | | | |
|---|---|---|---|
| EP | 0 188 363 | | 7/1986 |
| EP | 0 402 730 | | 12/1990 |
| EP | 2 166 269 | | 3/2010 |
| GB | 2 319 316 | | 5/1998 |
| WO | WO 84/03346 | | 8/1984 |
| WO | WO 01/02768 | | 1/2001 |
| WO | WO 01/36173 | | 5/2001 |
| WO | WO 03/006226 | | 1/2003 |
| WO | WO 03/095887 | | 11/2003 |
| WO | WO 2004/071742 | | 8/2004 |
| WO | WO 2004/082921 | | 9/2004 |
| WO | WO 2010/049627 | | 5/2010 |
| WO | WO 2010/069044 | | 6/2010 |
| WO | WO2012/004665 | * | 1/2012 ............ B29C 45/04 |
| WO | WO 2012/004665 | | 1/2012 |

OTHER PUBLICATIONS

Eckardt, H., "Techniques for Gas-Assist Injection Molding," Gas Assist Injection Molding, XX, XX, Jan. 1, 2001, pp. 30-59, XP00933575.

* cited by examiner

TECHNIQUES FOR COATING PIPES

This invention relates to coating pipes, in particular to apparatus and techniques for coating pipeline field joints and to pipelines having field joints coated by those techniques. The invention may be used with any pipe diameter, especially where a field joint coating is to be applied onto a parent coating system that provides thermal insulation.

Pipelines used in the oil and gas industry are usually formed of lengths of steel pipe—'pipe joints'—that are welded together end-to-end before the pipeline is laid. To mitigate corrosion of the pipeline and optionally also to insulate the fluids that the pipeline carries in use, the pipe joints are pre-coated with protective coatings that, optionally, are also thermally insulating.

Many variations are possible in the structure and composition of the coating to obtain the required protective or insulative properties. Polypropylene (PP) is most commonly used to coat the pipe joints from which pipelines are made. The PP is typically applied onto an anti-corrosion layer on the steel of a pipe joint, such as a fusion-bonded epoxy (FBE) base layer.

A three-layer PP (3LPP) coating may be used for corrosion protection. A five-layer PP (5LPP) coating may be used for additional thermal insulation. Additional layers are possible if still greater thermal insulation is needed, such as in a seven-layer PP (7LPP) coating. Readers skilled in the art will clearly understand the meaning of the terms 3LPP, 5LPP and 7LPP, which refer to successively greater levels of corrosion protection and insulation for a pipe.

A short length of pipe is left uncoated at each end of the pipe joint to facilitate welding. The resulting 'field joint' must be coated with a field joint coating to mitigate corrosion and to maintain whatever degree of insulation may be necessary for the purposes of the pipeline.

Where a pipeline is laid offshore, welding and field joint coating is commonly performed aboard a pipelaying vessel such as a laybarge that fabricates and launches the resulting pipe string using S-lay or J-lay methods. Welding and field joint coating may also be performed onshore at a spoolbase, where pipe joints are firstly joined to form long pipe stalks and the pipe stalks are later joined successively end-to-end to form a continuous pipe for spooling onto a visiting reel-lay vessel.

High-quality field joint coatings are important to ensure effective protection and insulation throughout the long design life of a subsea pipeline. It is also important that field joint coating operations can be completed quickly enough that they do not adversely delay the chosen fabrication process. This is a particular concern in an S-lay operation, where stepwise parallel processing in successive work stations allows the highest fabrication rate to minimise tie-up of a valuable pipelaying vessel.

WO 2012/004665 explains that the short period of time available for field joint coating in S-lay operations favours a cast-moulded polyurethane (CMPU) technique, in which a two-part urethane resin cross-links in a mould to form polyurethane (PU). By relying on curing rather than cooling to solidify the coating, a CMPU process allows a cycle time for coating that broadly corresponds to the cycle time of welding and so removes the coating process from the critical path in S-lay operations.

WO 2012/004665 goes on to explain that a CMPU field joint coating suffers from the dissimilarity between PP and PU, which undermines the bond strength between the pipe coating and the field joint coating. This introduces a risk that cracks may occur at the interface between the pipe coating and the field joint coating. For example, cracks may occur when the pipeline bends during spooling, laying or indeed in service, where the pipeline may experience significant thermal expansion and contraction. Water ingress via such cracks may corrode the pipe, reduce adhesion of the coating to the pipe and degrade the coating itself, particularly due to hydrolysis of PU at the high pressure of deep water where heat emanates from within the pipeline.

As WO 2012/004665 acknowledges, the disadvantages of a CMPU field joint coating may be mitigated by instead using PP as a field joint coating. A field joint coating of PP may be made by an injection-moulded polypropylene (IMPP) process, in which the field joint is enclosed by a mould that defines an annular mould cavity around the field joint. Molten PP is injected into the cavity under high pressure. PP is a thermoplastic material and therefore sets by cooling during and after injection. Once the PP has cooled to a self-supporting extent, the mould is removed, leaving a tube of PP around the field joint that serves as the field joint coating.

Advantageously, the resulting PP field joint coating has similar mechanical and chemical properties to the adjoining PP pipe coating. Also, the compatible thermoplastics materials of the pipe coating and the field joint coating fuse together at their mutual interface, resisting cracking and hence giving longer service life. The service temperature of PP is also markedly higher than PU.

Whilst a PP field joint coating is desirable for the above reasons, the IMPP process presents considerable challenges in the specific context of fabricating subsea pipelines. A key challenge is to minimise the cycle time to keep field joint coating off the critical path of the chosen pipeline fabrication technique, while giving the injected molten PP enough time to cool and solidify without sacrificing the quality of the coating.

The necessary cooling time is strongly dependent on the size, shape and particularly the depth of the mould cavity in a radial direction with respect to the pipe section, which determines the thickness of the field joint coating. The necessary cooling time may also depend upon the chosen fabrication process. In an S-lay operation, for example, the PP must be solid enough upon demoulding to resist flattening and permanent distortion when the pipe string is bent over the rollers of a stinger upon being launched from the pipelaying vessel. Conversely, in a J-lay operation, the field joint coating can be demoulded in a softer but still self-supporting state as it will cool quickly upon immersion in water before being at risk of permanent distortion when the pipe bends approaching the seabed.

Whilst a mould may, for example, be water-cooled to accelerate cooling in an IMPP process, careless forced cooling may reduce the quality of the field joint coating. Even then, the cycle time of IMPP coating may be too long to allow its use in S-lay operations. IMPP coating is more apt to be used in J-lay operations, which allow more time to coat the field joint as noted above.

IMPP coating also suffers from the viscosity of the molten PP and hence the need to pump and contain the PP at high moulding pressures. This adds to the bulk and cost of the mould and of the injection equipment that feeds molten PP to the mould.

The present invention aims to improve injection-moulding processes for field joint coating of subsea pipelines using thermoplastics such as PP. In particular, the invention aims to maintain or improve the quality of PP field joint coatings without prolonging coating operations; indeed, the invention allows coating operations to be accelerated without loss of quality, to the benefit of pipeline fabrication rates. The invention also aims to accelerate the cooling of injected thermoplastics and to improve control of the cooling process. Another aim of the invention to minimise the pressure at which molten thermoplastics must be supplied and injected into the mould cavity.

The inspiration for the invention is the challenge of volumetric contraction or shrinkage of thermoplastics materials as they cool after being injected into a mould cavity. Conventionally, shrinkage of thermoplastics materials has been addressed in two ways in the art of injection moulding.

Firstly, the mould cavity may be packed by continuing injection of molten thermoplastics material after the mould cavity has been filled, while maintaining or increasing injection pressure. This packing step compensates for initial shrinkage by injecting more molten material to keep the mould cavity full, despite shrinkage of previously-injected material as it cools and hardens during the packing step. However, packing at high pressure places further structural demands upon the mould tool and its ancillary equipment; it can also hinder removal of the mould tool for demoulding after the field joint coating has sufficiently set.

Secondly, the mould cavity is typically over-sized relative to the outline of the desired finished item, to a degree that is based upon the predicted shrinkage behaviour of the thermoplastics material during cooling after injection. Predicting shrinkage of the thermoplastics material takes account of various factors such as the material being injected, the injection temperature, the injection pressure, the holding pressure, the holding time and the geometry of the mould cavity.

Over-sizing the mould cavity recognises that it is not possible or desirable to continue packing throughout the cooling process. Packing pressure can be applied, and more thermoplastics material can be injected, only until the material at the entrance to the mould cavity—the gate—solidifies. Once the thermoplastics material in the gate solidifies, no more material can enter the mould cavity; also, injection pressure can no longer bear on the body of material that already fills the mould cavity. The packing step must then cease. Consequently, while the body of thermoplastics material in the mould cavity cools further after packing ceases, that body of material will undergo uncompensated shrinkage.

In the context of IMPP coating of a pipeline field joint, the body of thermoplastics material in the mould cavity tends to pull away radially inwardly from the mould wall as the material continues to shrink without the compensation of packing. Whilst that separating movement is beneficial for demoulding, it may be resisted to some extent by localised adhesion between the thermoplastics material and the mould wall. At the same time, the material in the mould cavity also tends to pull away from the other surfaces that define the mould cavity, namely the opposed ends of the pipe coating and the exposed pipe surface that defines the radially inward side of the mould cavity. However, the material in the mould cavity cannot pull away from those other surfaces as it is adhered or fused to them.

For these reasons, uncompensated shrinkage induces stresses in the moulded field joint coating. Where there is differential shrinkage, those stresses could warp the field joint coating. It is even possible for voids or depressions to be created in the field joint coating, which will further concentrate stresses experienced during spooling, laying and operation of the pipeline.

Maintaining or increasing injection pressure during a packing step is contrary to the objects of the invention. So, too, is continued injection of molten thermoplastics, which adds heat to the system and therefore tends to extend rather than shorten the cooling time.

WO 2012/004665 reflects the general state of the art insofar as it assembles a mould tool around a field joint and injects or pours a polymer through openings in the mould tool to form a field joint coating. WO 2001/002768 also describes a typical mould tool for injection-moulding a polymer coating, with holes that are closed by patches after injection. In both cases, the moulds are rigid and there is no provision for compacting the polymer coating.

WO 2012/004665 also teaches coolant circulation. Another example of a mould tool with coolant circulation is featured in WO 2001/036173.

It is known to use a solid ring or other part, separate from a mould, to pre-fill a void between a pipe and a mould. An example is disclosed in U.S. Pat. No. 4,660,861. Similarly, WO 03/095887 teaches how preformed rings may be arranged around a field joint. Then, a mould tool is fastened around the rings and insulating material is poured into the voids. The mould is removed when the insulating material solidifies. Also, WO 2010/049627 describes insulation of a pipe-in-pipe (PiP) joint using a hollow outer plastics sleeve. The cavity within the sleeve may contain an insulated solid ring. The cavity is then filled with an incompressible thermally insulating gel. However, no compacting is performed in these examples.

Compacting has been performed in the art of pipeline fabrication by wrapping a heat-shrinkable sleeve (HSS) around a field joint coating and shrinking that sleeve, as disclosed in WO 84/03346. Indeed, an HSS material is sometimes used as the mould itself.

In gas-assisted injection moulding applications designed to produce hollow moulded parts, WO 03/006226, WO 2004/082921, WO 2004/071742, EP 0402730 and DE 19852123 describe injection of a gas after injection of molten polymer into a mould. The injected gas creates a void or cavity within the molten polymer to make a hollow part while, if necessary, pushing excess polymer out of the mould cavity. All of these proposals aim to reduce the weight of the moulded part and to reduce localised sink marks.

DE 19852123 uses the injected gas to push molten polymer against and along an elongate mould wall like a piston. The injected gas displaces a melt front toward one end of the mould. Counter-pressure is applied to the opposite side of the melt front to control its velocity and progression.

Gas-assisted injection moulding processes as described above are typically used for car door handles or any thick parts that require a uniform surface and light weight. They are of no use for the production of field joint coatings on pipelines, which require a dense, uniform moulded layer that is uninterrupted by voids. Also, whilst the injected gas may be used to provide some initial cooling for thin-walled hollow products, that gas remains within the hollow part until demoulding and so cannot provide effective ongoing cooling throughout the protracted cooling cycle of a thick coating.

EP 0188363 describes a joint for insulated pipeline sections having a tubular sleeve with its ends shrunk down toward and sealed to the outer surfaces of the casings of the pipeline sections. The interior of the sleeve is filled with insulation material in the form of thermoset polyurethane foam. The foam serves to provide rigidity such that tensile and compressive forces acting on one pipeline section are transmitted through the joint to the other pipeline section. The sleeve is heat shrinkable prior to injecting the thermoset foam. The sleeve is limited to use with thermoset foams which are injected as cold liquids since other materials requiring heating to liquid form for injection into the cavity would deform the heat shrinkable sleeve. Similarly, WO 2010/069044 also describes a heat shrinkable sheet or casing which is filled with thermoset polyurethane foam for joining together two tubular sections.

EP 2166269 also describes connecting two tubular members using thermoset polyurethane foam. However, the foam is injected into a cavity and subsequently a heat shrinkable thermoplastics sleeve is heat shrunk onto the foam.

GB 2319316 describes a heat shrinkable sleeve forming connecting tubular sections. However, no filler material is described for filling the cavity created by the sleeve.

It is against this background that the present invention has been devised.

In one sense, the invention resides in a method of coating a field joint of a pipeline, comprising: positioning a mould tool around the field joint to define a mould cavity; injecting thermoplastics material into the mould cavity to form a field joint coating that will set in the mould cavity; and applying compacting pressure within the mould cavity radially inwardly against a radially outer side of the field joint coating, other than by continued injection of the thermoplastics material.

The application of compacting pressure against the field joint coating is advantageously phased as the thermoplastics material shrinks in the mould cavity while the field joint coating sets. This accelerates and controls cooling of the field joint coating while maximising quality.

Preferably, a compacting fluid—and more preferably a compacting liquid—is used to apply the compacting pressure against the field joint coating. A compacting fluid is advantageously introduced into the mould cavity between the mould tool and the field joint coating, where the fluid may be forced along an interface between the mould tool and the field joint coating to separate the field joint coating from the mould tool.

The compacting fluid may be brought into contact with the field joint coating in the mould cavity. Alternatively, the compacting fluid may be separated from the field joint coating in the mould cavity by an intermediate partition that moves in the mould cavity under pressure from the compacting fluid to exert pressure from the compacting fluid against the field joint coating. The partition may partially define a chamber for holding the compacting fluid when demoulding the field joint coating. The partition may also be deflectable, for example like a membrane, to conform to the radially outer side of the field joint coating under pressure from the compacting fluid.

Advantageously, the field joint coating may be cooled, while liquid in the mould cavity, by transferring heat from the field joint coating to the compacting fluid that applies pressure against the field joint coating. Heat transfer to the compacting fluid may be improved by passing a flow of compacting fluid through the mould cavity to remove heat from the field joint coating. The compacting fluid may be cooled, for example in a heat exchanger outside the mould cavity or by transferring heat from the compacting fluid to the mould tool and passing a flow of cooling fluid through the mould tool to reject that heat.

The application of compacting pressure may be preceded by an initial compacting step comprising continued injection of the thermoplastics material into the mould cavity after the mould cavity has been filled. In any event, it is preferred to cease injection of thermoplastics material into the mould cavity before applying compacting pressure.

In another sense within the same inventive concept, the invention also resides in apparatus for coating a field joint of a pipeline. That apparatus comprises: a mould tool positionable around the field joint to define a mould cavity, the mould tool having one or more gates through which thermoplastics material may be injected into the mould cavity to form a field joint coating that sets in the mould cavity; a thermoplastics supply system for supplying thermoplastics material to the, or each, gate of the mould tool; and a compacting system additional to the thermoplastics supply system for applying compacting pressure within the mould cavity radially inwardly against a radially outer side of the field joint coating.

The compacting system preferably comprises a fluid supply system for injecting compacting fluid into the mould cavity between the mould tool and the field joint coating. The fluid supply system suitably comprises one or more fluid inlets that penetrate a wall of the mould tool and that terminate inwardly at an inner surface of that wall.

The apparatus of the invention preferably comprises a cooling system for cooling the compacting fluid, which system may cool the compacting fluid by cooling the mould tool and/or by passing the compacting fluid through a heat exchanger outside the mould cavity.

The mould tool suitably comprises one or more fluid outlets, additional to one or more fluid inlets, whereby compacting fluid can flow through the mould cavity to remove heat from the field joint coating.

The inventive concept extends to a pipeline production facility performing the method of the invention or comprising the apparatus of the invention. The inventive concept also extends to a pipeline or a field joint for a pipeline, produced by performing the method of the invention, by the apparatus of the invention or by the pipeline production facility of the invention.

To summarise the invention, a field joint of a pipeline is coated in a thermoplastics injection moulding process by positioning a mould tool around the field joint to define a mould cavity. Thermoplastics material is injected into the mould cavity to form a field joint coating that will set in the mould cavity. Compacting pressure is applied radially inwardly within the mould cavity against a radially outer side of the field joint coating, preferably as the thermoplastics material shrinks in the mould cavity while the field joint coating sets. A compacting fluid introduced into the mould cavity between the mould tool and the field joint coating may be used to apply pressure against the field joint coating.

In order that the invention may be more readily understood, reference will now be made, by way of example, to the accompanying drawings in which.

Figure 1:
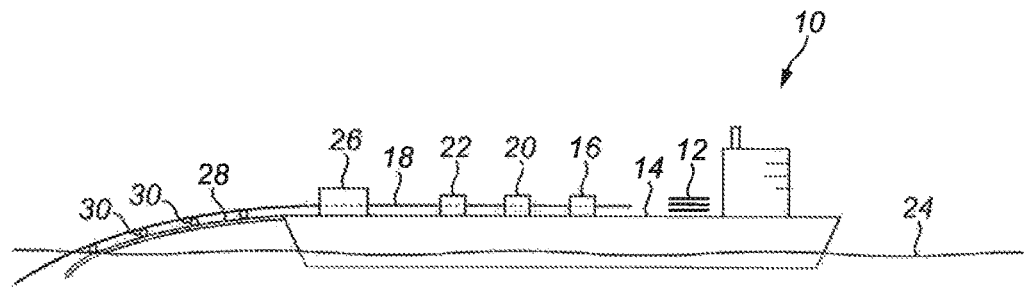
FIG. 1 is a schematic side view of a lay barge configured for S-lay operation, showing a typical context for the coating techniques of the present invention.

Referring firstly to the schematic view of FIG. 1 of the drawings, a pipelaying vessel 10 is configured for the S-lay installation method and moves from left to right as illustrated during a pipelaying operation. The vessel 10 carries a supply of pipe joints 12 on its deck 14 that are welded together at one or more welding stations 16 to form a pipe string 18 that moves aft with respect to the vessel 10 along a firing line. The welds are tested at one or more testing stations 20 located downstream (i.e. aft) of the welding stations 16 and are then coated at one or more coating stations 22 located downstream of the testing stations 20. The welding stations 16, testing stations 20 and coating stations 22 thus lie on the firing line along which the pipe string 18 moves as it is assembled, checked and coated before being launched from the vessel 10 into the sea 24.

The pipe string 18 is supported by a tensioner system 26 located downstream of the coating stations 22. The tensioner system 26 typically comprises multiple tensioners but such details are not relevant to the invention and so have been omitted from the drawings.

The pipe string 18 is launched from the vessel 10 over a stinger 28 extending aft of the vessel 10, located downstream of the tensioner system 26. The stinger 28 comprises rollers 30 that support the overbend of the pipe string 18 as it enters the sea 24.

In this example, the pipe string 18 hangs from the stinger 28 in a shallow S-shape under tension acting between the tensioner system 26 and a touchdown point on the sea bed (not shown). It is possible for a pipe string to experience a much greater deflection through the overbend than is shown in FIG. 1, especially in so-called Steep S-lay operations in which the departure angle of the pipe string is close to vertical as it leaves the stinger.

The invention is concerned with coating operations performed at the coating stations 22 on the firing line, which will now be described with reference to FIGS. 2 to 7 of the drawings.

FIGS. 2 to 7 show a mould tool 32 in accordance with the invention, encircling a welded field joint of a pipeline at a coating station 22. The field joint is created between abutting pipe joints 34 where a circumferential butt weld 36 attaches the pipe joints 34 to each other.

Each pipe joint 34 is coated with a parent coating, for example a 5LPP coating 38, and that coating 38 terminates short of the end of each pipe joint 34 with a typically chamfered end shape. An annular gap lies between the opposed ends of the coating 38 around the weld 36, where the exposed external surfaces of the pipe joints 34 need to be coated. For this purpose, the mould tool 32 is fixed around the field joint, extending from one coating 38 to the other and overlapping those coatings 38 to define a mould cavity 40. The mould cavity 40 includes the annular gap between the coatings 38, into which molten thermoplastics material is injected as a field joint coating.

The mould tool 32 comprises a tube 42 of generally circular cross-section, divided longitudinally on a diameter of the cross-section into two halves. Opposed end portions 44 of the tube 42 seat against the coatings 38 of the respective pipe joints 34 and so have an internal diameter corresponding to the external diameter of the coated pipe joints 34.

A central portion 46 of the tube 42 encompassing the gap between the coatings 38 has an increased internal diameter that exceeds the external diameter of the coated pipe joints 34. This increases the depth of the mould cavity 40 to allow for shrinkage of the injected thermoplastics material as it cools. The enlarged central portion 46 extends beyond the chamfered ends of the coatings 38 to define extensions 48 of the mould cavity 40.

The two halves of the mould tool 32 are assembled together to encircle the field joint. Where they meet, the two halves have flanges 50 that are clamped together by external clamps 52 represented schematically in FIG. 2. The clamps 52 hold together the two halves against internal pressure within the mould tool 32 in use; they also hold the mould tool 32 in sealing engagement with the coatings 38 of the pipe joints 34. Inwardly-facing seals 54 are suitably provided in the end portions 44 of the mould tool for that purpose, as can be seen in FIGS. 3 to 7.

The tubular wall of the mould tool 32 is penetrated by an array of injection nozzles or gates 56 for injection into the mould cavity 40 of molten PP 58 supplied through respective feed lines 60 under pressure from a supplying reservoir or machine 62. A circumferential array of three gates 56 are shown in this example, equi-angularly spaced around the circumference of the tubular wall at a central longitudinal position.

Each gate 56 has a respective valve 64 that controls the injection of molten PP 58 through that gate 56. The valves 64 are controlled by a central control unit 66 shown in FIG. 2 and may be operated together or independently of each other. To simplify illustration, poppet valve elements 68 are shown schematically in the valves 64; other valve types are of course possible.

Vents 70 at both ends of the tubular wall of the mould tool 32 allow air to escape as the mould cavity 40 fills with molten PP 58. The mould tool 32 also has an optional cooling system comprising a water jacket created by an array of parallel pipes 72 embedded in or disposed on the tubular wall of the mould tool 32. Other cooling fluids such as oil or a gas could be pumped through the pipes 72 instead of water. It is also possible for a warm fluid to be pumped through the pipes 72 so as to warm up the mould tool 32 before use.

In accordance with the invention, the tubular wall of the mould tool 32 is further penetrated by one or more fluid inlets 74 connected to a fluid supply system 76. The fluid supply system 76 is entirely separate from the system that supplies molten PP 58 to the gates 56. In this example, there are two fluid inlets 74, located inboard from the ends of the mould tool 32 to align approximately with the chamfered ends of the coatings 38 of the pipe joints 34, just inboard of the extensions 48 of the mould cavity 40.

The fluid supply system 76 communicating with the fluid inlets 74 comprises a fluid reservoir 78, a high-pressure pump 80 and a valve 82, all of which are interconnected by fluid lines 84 that lead to the fluid inlets 74. The pump 80 and the valve 82 are both controlled by a controller 86 to admit a compacting fluid 88 from the reservoir 78 into the mould cavity 40. The compacting fluid 88 may be a gas or, preferably, a liquid such as oil.

A vent may be provided in the mould tool 32 to allow air to escape as compacting fluid 88 enters the mould cavity 40, but such a vent has been omitted from the drawings for simplicity.

Before the injection moulding operation begins, the bare uncoated external surfaces of the pipe joints 34 are cleaned, primed and heated, as are the chamfered end surfaces of the coatings 38.

Figure 3:
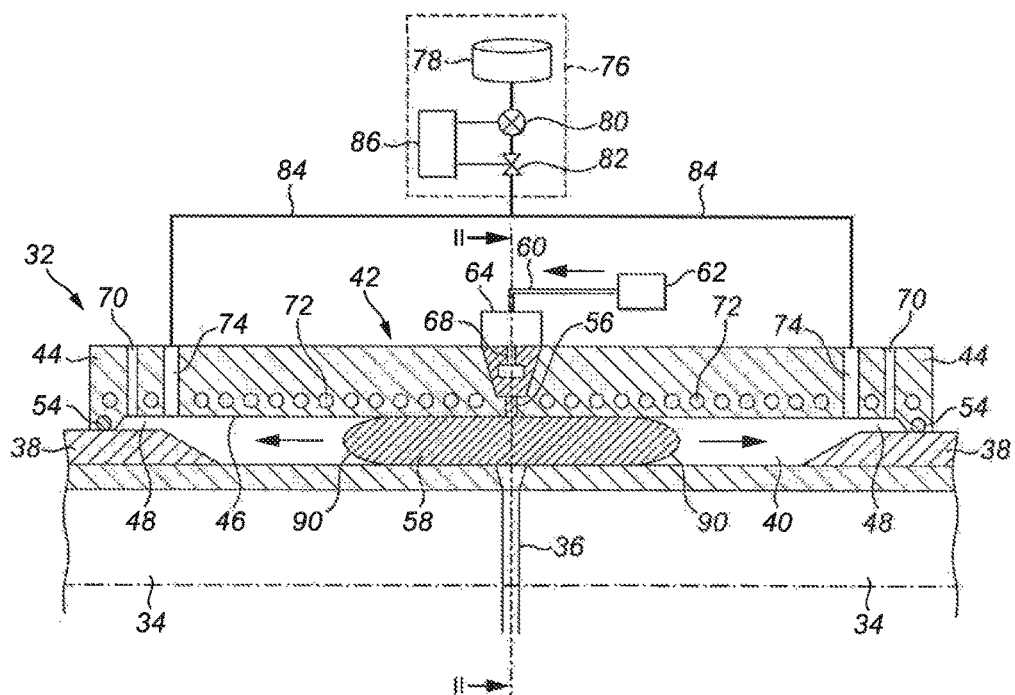
FIGS. 3 to 7 are longitudinal sectional detail views of the mould tool and field joint on line III-III of FIG. 2, showing the progression over time of an injection moulding operation in accordance with the invention.

In FIG. 3, the injection moulding operation has begun by opening the valves 64 associated with the gates 56 (only one of which is shown in this view) to admit a melt of pressurised molten PP 58. As injection continues during mould filling as shown, the injected melt has two melt fronts 90 that advance in opposite longitudinal directions from the gates 56 toward respective ends of the mould cavity 40.

Figure 4:
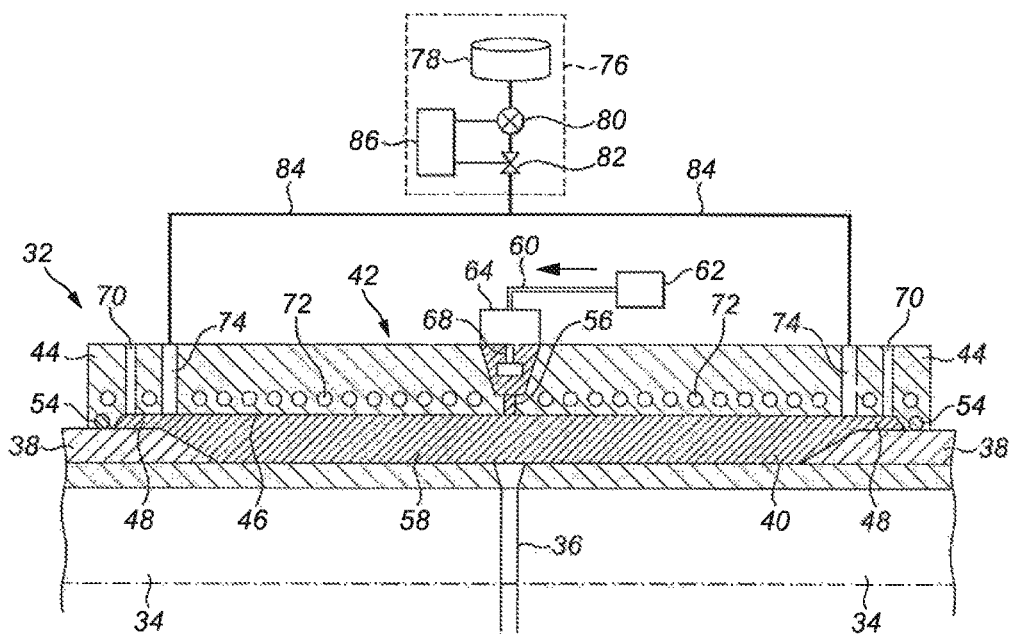

FIG. 4 shows the mould cavity 40 now full of PP 58 when the melt fronts 90 reach and fill the extensions 48 at respective ends of the mould cavity 40. The interior of the melt of PP 58 remains molten at this stage but the melt starts to freeze as the PP 58 cools. The melt solidifies from the outside in by virtue of heat transfer via its exterior.

Solidification of the PP 58 results in shrinkage that is compensated initially by an optional brief packing step as shown in FIG. 4. It will be noted in this respect that the valves 64 associated with the gates 56 remain open at this stage so that additional PP 58 is forced into the mould cavity for a short period to keep the mould cavity full and so to compensate for shrinkage.

Figure 5:
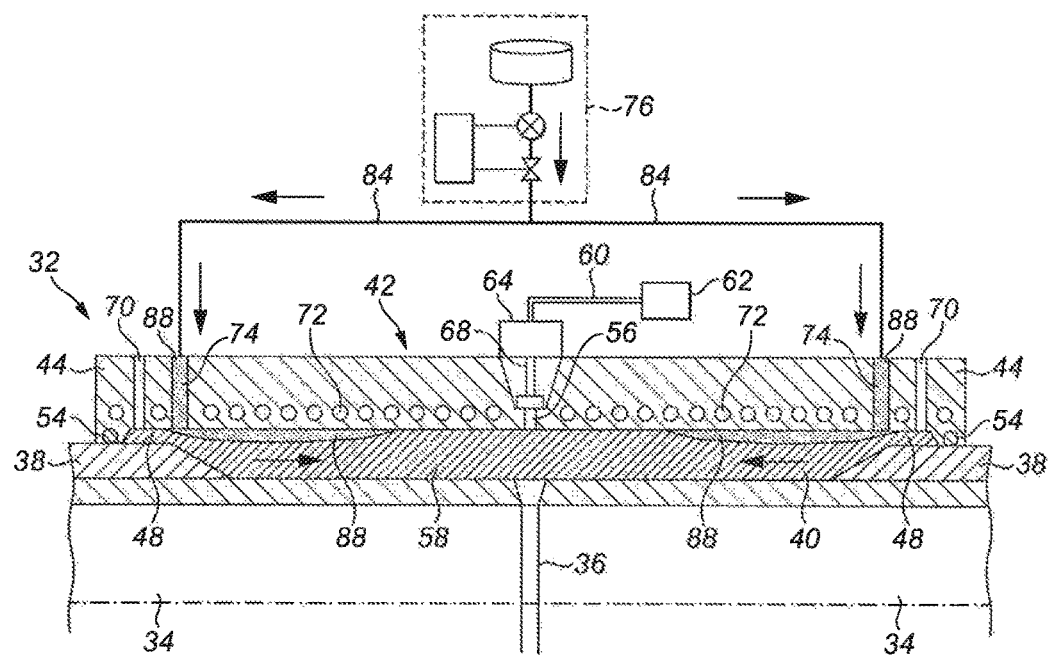
Figure 6:
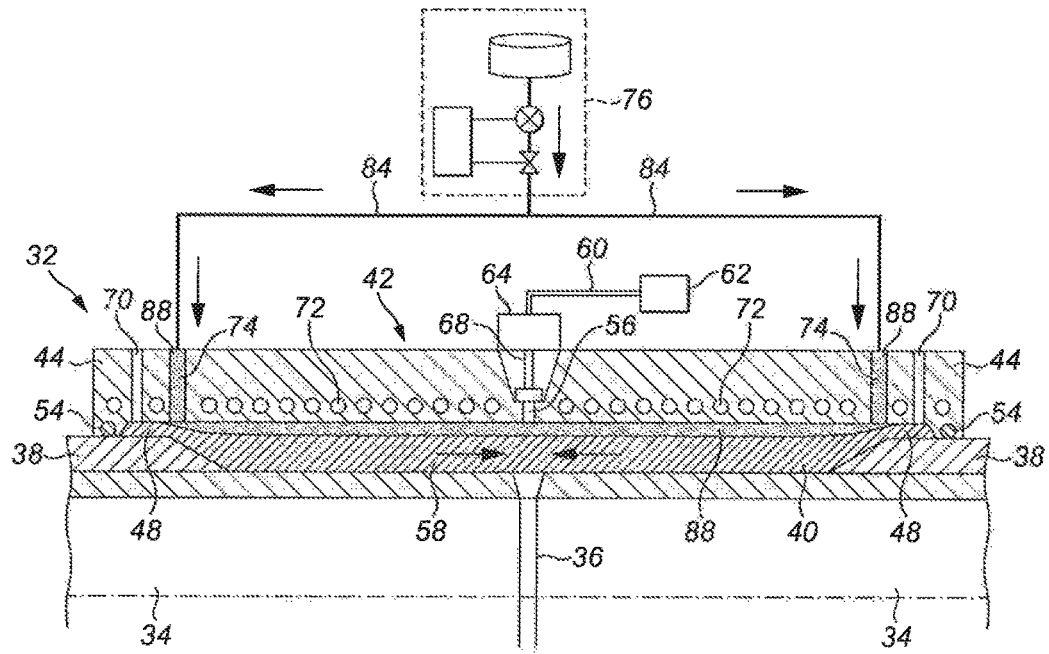

With reference now to FIGS. 5 and 6 of the drawings, the packing step ceases before PP 58 in the gates starts to freeze. The valves 64 associated with the gates 56 are then closed so that no further PP 58 is admitted to the mould cavity 40. Consequently, the melt no longer receives heat input and so cools more quickly than if the packing step was prolonged. Cooling can be accelerated by passing cooling fluid through the pipes 72 of the cooling system of the mould tool 32.

From the end of the packing step, in the prior art, continued cooling of PP 58 already in the mould cavity 40 would result in the drawbacks of uncompensated shrinkage. In contrast, the invention compensates for shrinkage by a compaction step that, unlike packing, does not involve continued injection of PP 58. Instead, in this example, the compaction step uses the compacting fluid 88 to apply radially inward pressure against the PP 58 in the mould cavity 40.

The prior art does not teach in-mould compaction of a field joint coating by injecting a fluid additional to the molten thermoplastics material that forms the field joint coating.

Indeed, no fluid other than a viscous coating material, a curing product or a chemical additive has been known to be used inside a mould cavity between a pipe and a mould tool.

When the controller 86 of the fluid supply system 76 activates the pump 80 and opens the valve 82, the compacting fluid 88 is drawn through the lines 84 from the reservoir 78 to be injected under pressure into the mould cavity 40 through the fluid inlets 74. The fluid inlets 74 inject the compacting fluid 88 as a thin layer between the tubular wall of the mould tool 32 and the PP 58 that is also in the mould cavity 40. In this example, there is direct contact between the compacting fluid 88 and the PP 58 in the mould cavity 40.

Advantageously, as shown in FIG. 5, the compacting fluid 88 is forced under pressure to propagate along the interface between the mould tool 32 and the PP 58 in the mould cavity 40 to separate the PP 58 from the mould tool 32 with a peeling action. This prevents adhesion of the PP 58 to the mould tool 32 or detaches the PP 58 from the mould tool 32 if such adhesion has already occurred.

Eventually the compacting fluid 88 extends nearly the full length of the mould cavity 40 to separate the PP 58 from the mould tool 32 as shown in FIG. 6. This eases eventual demoulding and is one way in which the compacting fluid 88 helps to reduce stress in the solidifying PP 58. Pressure is maintained in the compacting fluid 88 as the solidifying PP 58 shrinks; more compacting fluid 88 is introduced into the mould cavity 40 as may be necessary to account for continued shrinkage of the PP 58.

As the compacting fluid 88 will generally be injected at a lower temperature than the PP 58 at that stage, the compacting fluid 88 acts as a heat sink to draw heat from the PP 58 and so to accelerate cooling of the PP 58. Intimate thermal contact between the compacting fluid 88 and the PP 58 across a large surface area is advantageous in this respect.

The cooling system of the mould tool 32 may remain active to draw heat from both the compacting fluid 88 and the PP 58.

Figure 2:
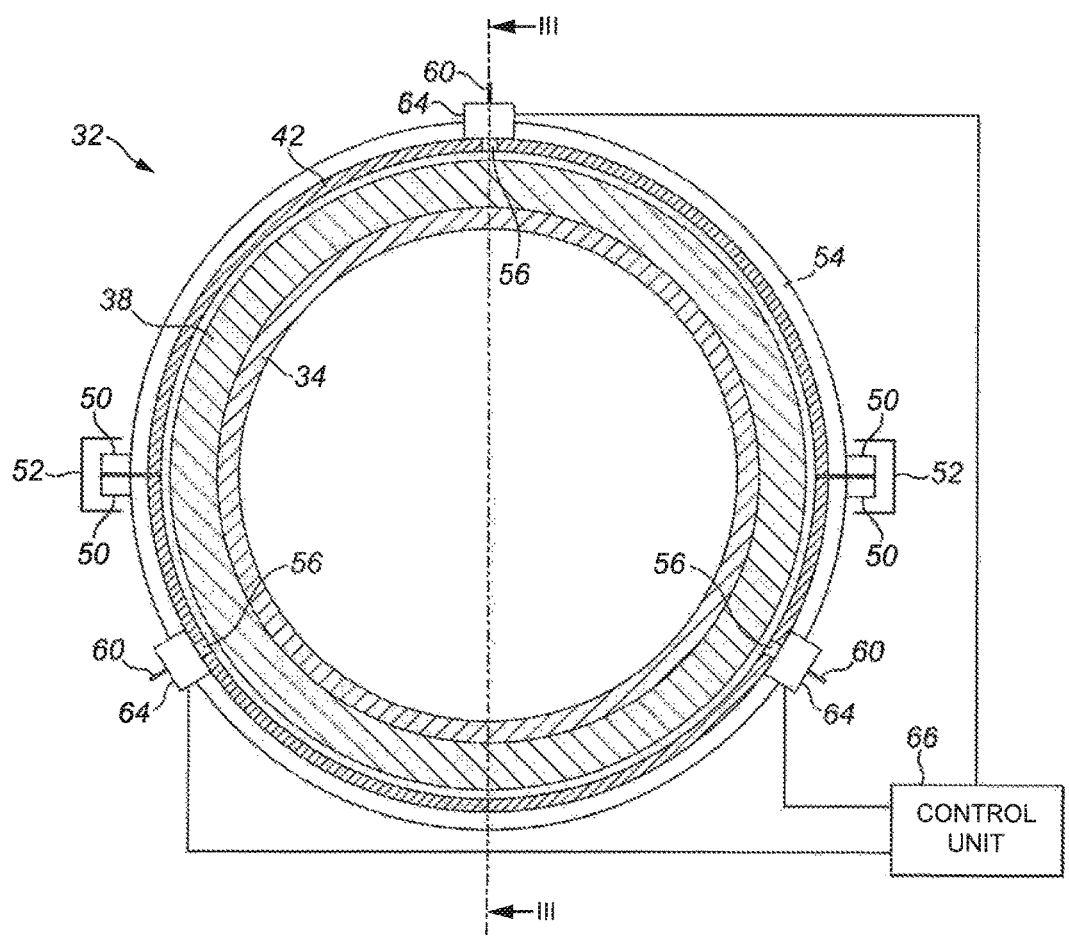
FIG. 2 is a schematic cross-sectional view on line II-II of FIG. 3, showing a mould tool in accordance with the invention positioned around a field joint.

When the operation parameters have been checked and the PP 58 in the mould cavity 40 has cooled and solidified to an appropriately self-supporting extent, the compacting fluid 88 is depressurised and drained, for example by reversing the pump 80 to return the compacting fluid 88 to the reservoir 78. The clamps 50 shown in FIG. 2 are then released to separate and remove the two halves of the mould tool 32 from the field joint in a demoulding operation. The PP 58 is then air-cooled to ambient temperature by exposure to ambient air as shown in FIG. 7.

If faster cooling is required, air or other cooling gases may be blown over the exposed PP 58 to cool the PP 58 by conduction and convection. Alternatively, or additionally, a cooling liquid such as water may be sprayed or poured over the exposed PP 58, to cool the PP 58 by conduction and evaporation. The temperature and/or the flow rate of cooling liquids or gases may be modified to control the rate of cooling; for example, such liquids or gases may be refrigerated to below ambient temperature.

Figure 7:
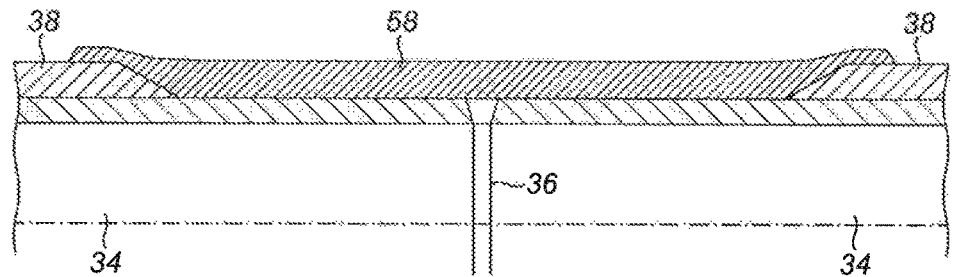

It will be noted from FIGS. 6 and 7 that the oversized central portion 46 of the mould tool 32 and the compensated, controlled shrinkage of the PP 58 under pressure from the compacting fluid 88 determines and controls the external shape and dimensions of the finished field joint coating. The end result is predictable, uniform and consistent from one field joint coating to the next, both in external shape and internal structure.

The external diameter of the finished field joint coating broadly corresponds to the external diameter of the coated pipe joints 34 to either side of the field joint. By virtue of the extensions 48 at the ends of the mould cavity 40, the ends of the field joint coating overlap the pipe coatings 38 slightly. Those overlaps beneficially lengthen and hence increase the area of the interfaces between the pipe coatings 38 and the field joint coating.

Figure 8:
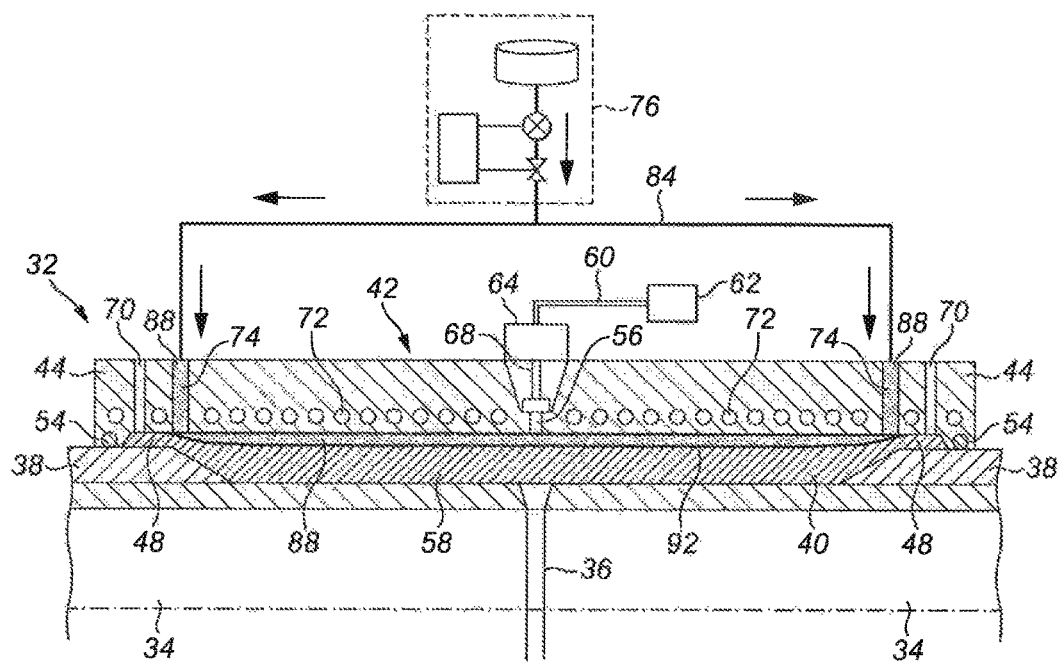
FIGS. 8 and 9 are longitudinal sectional detail views corresponding to FIGS. 3 to 7 but showing variants of the mould tool in other embodiments of the invention.
Figure 9:
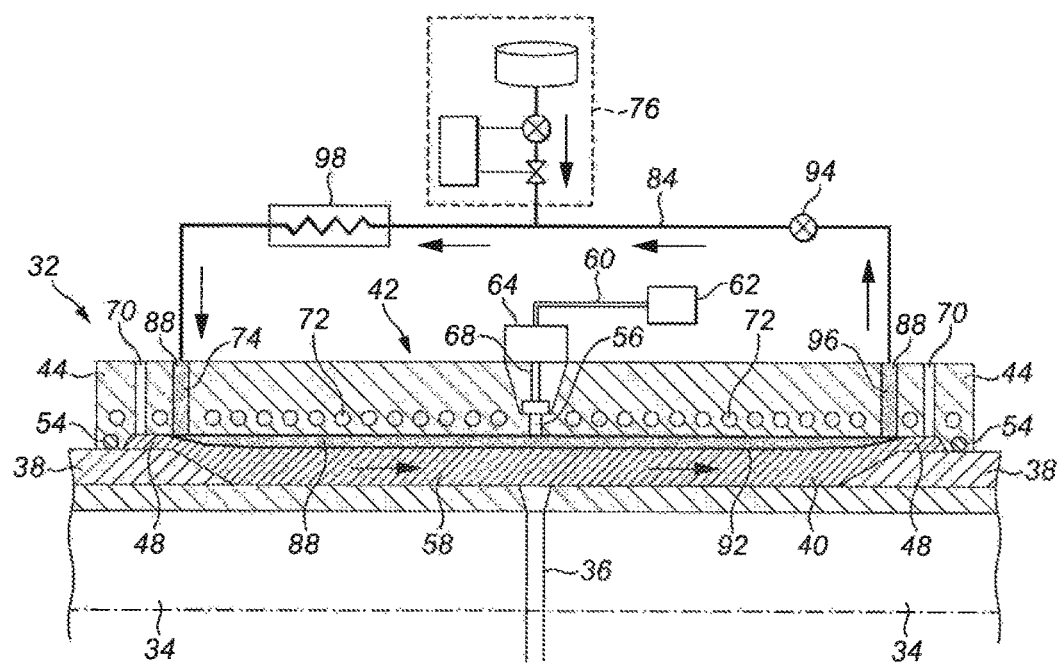

FIGS. 8 and 9 show variants of the invention in which a flexible, resiliently-stretchable membrane 92 is interposed between the compacting fluid 88 and the PP 58. The membrane 92 is sealed around its periphery to the interior of the mould tool 32, outboard of the fluid inlets 74, to define an expandable chamber that encloses the compacting fluid 88 that is admitted through the fluid inlets 74.

As the chamber between the mould tool 32 and the membrane 92 expands under increasing pressure from the compacting fluid 88 within it, the membrane 92 exerts fluid pressure on the PP 58. The membrane 92 is thin enough not to interfere excessively with heat transfer from the PP 58 to the compacting fluid 88. However, direct contact between the compacting fluid 88 and the PP 58 is avoided and the compacting fluid 88 remains contained by the membrane 92 for ease of handling, especially when depressurising and draining the compacting fluid 88 for demoulding.

FIG. 9 differs from FIG. 8 by an optional provision for the compacting fluid 88 to flow into, through and out of the chamber defined by the membrane 92, while continuing to apply fluid pressure to the PP 58 through the membrane 92. This allows the compacting fluid 88 to convey heat from the PP 58 out of the mould cavity 40 and to reject that heat outside the mould cavity 40. A similar provision for flowing compacting fluid 88 through the mould cavity 40 could be made in a variant of the first embodiment shown in FIGS. 2 to 7.

Specifically, FIG. 9 shows a heat-exchange circuit comprising a circulation pump 94. The pump 94 recirculates the compacting fluid 88 from a fluid outlet 96 through a heat exchanger 98 outside the mould cavity 40 and returns the compacting fluid 88 through a fluid inlet 74 to the mould cavity 40 at a lower temperature.

In some cases, compacting fluid 88 need not be recirculated: for example, if the compacting fluid 88 is water and so is inexpensive and has no environmental impact, it could be discarded after passing though the mould cavity 40.

Whilst FIG. 9 shows a cooling system for the mould tool 32 comprising pipes 72 as in the preceding embodiments, it is possible that cooling via the compacting fluid 88 could remove the need for a separate cooling system for the mould tool 32.

The present invention is particularly apt to be used in S-lay operations but its use is not limited to S-lay. The invention can also be used in J-lay operations and when fabricating and spooling reel-lay pipelines at a spoolbase. For example, like S-lay, the pipeline is horizontal and is guided on a system of rollers at a spoolbase, where weld testing and field joint coating takes place between two ends of the pipeline. Welding takes place at one end to assemble the pipeline; once tested and coated, the pipeline is spooled onto a reel at the other end.

Many other variations are possible within the inventive concept. For example, the mould tool may have more or fewer gates as appropriate and they may be distributed differently over the mould tool. Also, gates of the mould tool may open in longitudinal or circumferential succession to enable cascade moulding as proposed in WO 2012/004665.

Optionally, a mould tool cooling system may be supplemented by a pipe cooling device positioned inside abutting pipe joints to cool the melt by accelerating conduction of heat through the pipe wall. Such a pipe cooling device may, for example, be a refrigerated pig or a spray head that is movable longitudinally along the pipe to apply cooling where it is needed. An example of such a spray head is also disclosed in WO 2012/004665.

The thermoplastics material used for injection moulding may be PP, polystyrene or other suitable thermoplastics material that is compatible with the coating applied to the pipe joints. Additives or modifiers may be employed, such as an elastomeric modifier like EPDM (ethylene propylene diene monomer rubber) to provide appropriate flexibility and impact resistance, or fibres of glass, aramid or carbon to increase strength and elastic modulus. Additives such as fibres may also reduce shrinkage and speed cooling.

The invention claimed is:

1. A method of coating a field joint of a pipeline, comprising:
    positioning a mould tool around the field joint, the mould tool having a tubular wall to define an annular mould cavity around the field joint;
    injecting thermoplastics material into the mould cavity through the tubular wall, to form a field joint coating that will set in the mould cavity;
    introducing a compacting fluid through the tubular wall into the mould cavity between the tubular wall and the field joint coating to apply compacting pressure within the mould cavity radially inwardly against a radially outer side of the field joint coating, other than by continued injection of the thermoplastics material; and
    separating the compacting fluid from the field joint coating by an intermediate partition that moves in the mould cavity under pressure from the compacting fluid to exert pressure from the compacting fluid against the field joint coating.

2. The method of claim 1, comprising applying said compacting pressure against the field joint coating as the thermoplastics material shrinks in the mould cavity while the field joint coating sets.

3. The method of claim 1, wherein the compacting fluid is a liquid.

4. The method of claim 1, comprising forcing the compacting fluid along an interface between the mould tool and the field joint coating to separate the field joint coating from the mould tool.

5. The method of claim 1, comprising bringing the compacting fluid into contact with the field joint coating in the mould cavity.

6. The method of claim 1, comprising deflecting the partition to conform to the radially outer side of the field joint coating under pressure from the compacting fluid.

7. The method of claim 1, comprising demoulding the field joint coating while holding the compacting fluid in a chamber partially defined by the partition.

8. The method of claim 1, comprising cooling the field joint coating, while liquid in the mould cavity, by transferring heat from the field joint coating to the compacting fluid that applies pressure against the field joint coating.

9. The method of claim 8, comprising passing a flow of compacting fluid through the mould cavity to remove heat from the field joint coating.

10. The method of claim 8, comprising cooling the compacting fluid.

11. The method of claim 10, comprising transferring heat from the compacting fluid to the mould tool and passing a flow of cooling fluid through the mould tool to reject that heat.

12. The method of claim 10, comprising passing a flow of the compacting fluid outside the mould cavity to reject heat from the compacting fluid.

13. The method of claim 1, wherein said application of compacting pressure is preceded by an initial compacting step comprising continued injection of the thermoplastics material into the mould cavity after the mould cavity has been filled.

14. The method of claim 1, comprising ceasing injection of thermoplastics material into the mould cavity before said application of compacting pressure.

\* \* \* \* \*